United States Patent
Darois et al.

(10) Patent No.: US 7,175,439 B2
(45) Date of Patent: Feb. 13, 2007

(54) TRAINING DEVICE FOR EXTINGUISHING FIRES, METHOD AND SYSTEM OF USE THEREOF

(75) Inventors: Paul R. Darois, Parkersburg, WV (US); Steven Galonska, Ypsilanti, MI (US); John Blackburn, Troy, NY (US); Burt L. Swersey, Stephentown, NY (US); Travis B. Bashaw, Wilmington, MA (US)

(73) Assignee: Rensselaer Polytechnic Institute, Troy, NY (US)

(*) Notice: Subject to any disclaimer, the term of this patent is extended or adjusted under 35 U.S.C. 154(b) by 96 days.

(21) Appl. No.: 10/966,740

(22) Filed: Oct. 15, 2004

(65) Prior Publication Data

US 2005/0202379 A1  Sep. 15, 2005

Related U.S. Application Data

(60) Provisional application No. 60/552,039, filed on Mar. 10, 2004.

(51) Int. Cl.
*G09B 19/00* (2006.01)

(52) U.S. Cl. ......................... 434/226; 434/219

(58) Field of Classification Search ............... 434/219, 434/226, 362, 365; 169/45
See application file for complete search history.

(56) References Cited

U.S. PATENT DOCUMENTS

| 4,001,949 | A | * | 1/1977 | Francis ..................... 434/226 |
| 4,864,146 | A |   | 9/1989 | Hodges et al. |
| 4,983,124 | A | * | 1/1991 | Ernst et al. ................ 434/226 |
| 5,059,124 | A |   | 10/1991 | Tsujita |
| 5,226,818 | A | * | 7/1993 | Feiock et al. ............... 434/226 |
| 5,275,571 | A | * | 1/1994 | Musto et al. ............... 434/226 |
| 5,447,437 | A |   | 9/1995 | Joynt et al. |
| 5,518,402 | A |   | 5/1996 | Tommarello et al. |
| 5,752,835 | A |   | 5/1998 | Whitmer, Sr. |
| 5,823,784 | A | * | 10/1998 | Lane .......................... 434/226 |
| 6,155,837 | A |   | 12/2000 | Korneliussen |
| 6,189,623 | B1| * | 2/2001 | Zhegrov et al. ............. 169/45 |
| 6,500,008 | B1|   | 12/2002 | Ebersole et al. |
| 6,616,454 | B2| * | 9/2003 | Ebersole et al. ........... 434/226 |
| 2003/0121672 | A1 | | 7/2003 | Spaniol et al. |

FOREIGN PATENT DOCUMENTS

| FR | 2714197 A1 | * | 6/1995 |
| JP | 02212879 A | * | 8/1990 |
| JP | 11305647 A | * | 11/1999 |

* cited by examiner

*Primary Examiner*—Joe H. Cheng
(74) *Attorney, Agent, or Firm*—Schmeiser, Olsen & Watts (57) ABSTRACT

Devices for training in extinguishing fires comprising a control unit and a flame generation unit as well as methods and systems of use thereof are presented.

53 Claims, 4 Drawing Sheets

TRAINING DEVICE FOR EXTINGUISHING FIRES, METHOD AND SYSTEM OF USE THEREOF

RELATED APPLICATION

The present invention claims priority to the U.S. Provisional Application No. 60/552,039, filed Mar. 10, 2004 and entitled "Intelligent Fire Extinguishing Training System" and is incorporated herein by reference in its entirety.

BACKGROUND OF THE INVENTION

1. Field of the Invention

The present invention relates to a device, a method, and a system for training individuals in extinguishing fires, and in particular, training involving controlled, live fires.

2. Related Art

In the field of fire extinguishment training, great efforts toward devices and systems able to train individuals are continuously being made, especially, training under controlled, live fire situations. Due to the high cost, high risk for injury, exposure to hazardous and environmentally damaging materials, lack of quantitative and qualitative feedback, and lack of user guidance of present day devices and systems, their utilization for such training is limited and often impractical for adoption by private, commercial, and government sectors.

Thus, there is a need for a device, method and system which overcomes at least one of the aforementioned, and other, deficiencies in the art of training individuals in fire extinguishing.

SUMMARY OF THE INVENTION

The present invention provides a device, method and system thereof for training individuals in extinguishing fires which overcomes at least one of the aforementioned deficiencies and others and inter alia provides a training device and method for maximum and efficient training in extinguishing fires.

In a first general aspect of the present invention is a device for training in extinguishing fires comprising: a control unit wherein said control unit receives an input and automatically provides an output in response to said input; and a flame generation unit in communication with said control unit.

In a second general aspect of the present invention is a method for training in extinguishing fires comprising: providing a control unit wherein said control unit receives an input and automatically provides an output in response to said input; providing a flame generation unit in communication with said control unit; and applying said input.

In a third general aspect of the present invention is a device for training in extinguishing fires comprising: a control unit wherein said control unit receives an input and automatically provides an output in response to said input, and wherein further said control unit is operably adaptable to a flame generation device and operably adaptable to a flame suppression device.

In a fourth general aspect of the present invention is a method for training in extinguishing fires comprising: providing a control unit wherein said control unit receives an input and automatically provides an output in response to said input, and wherein further said control unit is operably adaptable to a flame generation device and is operably adaptable to a flame suppression device; providing said flame generation device; providing said flame suppression device; and applying an input;

In a fifth general aspect of the present invention is a device for training in extinguishing fires comprising: a flame generation unit wherein said flame generation unit has at least one input sensor for receiving at least one input and further wherein said flame generation unit is operably adaptable to communicate with a control unit, wherein said control unit can automatically provide an output in response to said input.

In a sixth general aspect of the present invention is a method for training in extinguishing fires comprising: providing a flame generation device wherein said flame generation device has at least one input sensor for receiving at least one input and further wherein said flame generation device is operably adaptable to a control unit; providing a control unit wherein said control unit automatically provides an output in response to said input; and applying said input.

In a seventh general aspect of the present invention is a device for training in extinguishing fires comprising: a control unit wherein said control unit receives an input and automatically provides an output to a flame generation unit in response to said input; and said flame generation unit in communication with said control unit.

In an eighth general aspect of the present invention is a system for training in extinguishing fires comprising: a control unit wherein said control unit receives an input and automatically provides an output in response to said input; and at least one flame generation unit in communication with said control unit; and a fire suppression device operably adaptable with said control unit.

The foregoing and other features and advantages of the invention will be apparent from the following more particular description of preferred embodiments of the invention.

BRIEF DESCRIPTION OF THE DRAWINGS

In order that those skilled in the art will be better able to practice the invention, reference will be made to the drawings, wherein.

DETAILED DESCRIPTION OF EMBODIMENTS

Figure 1:
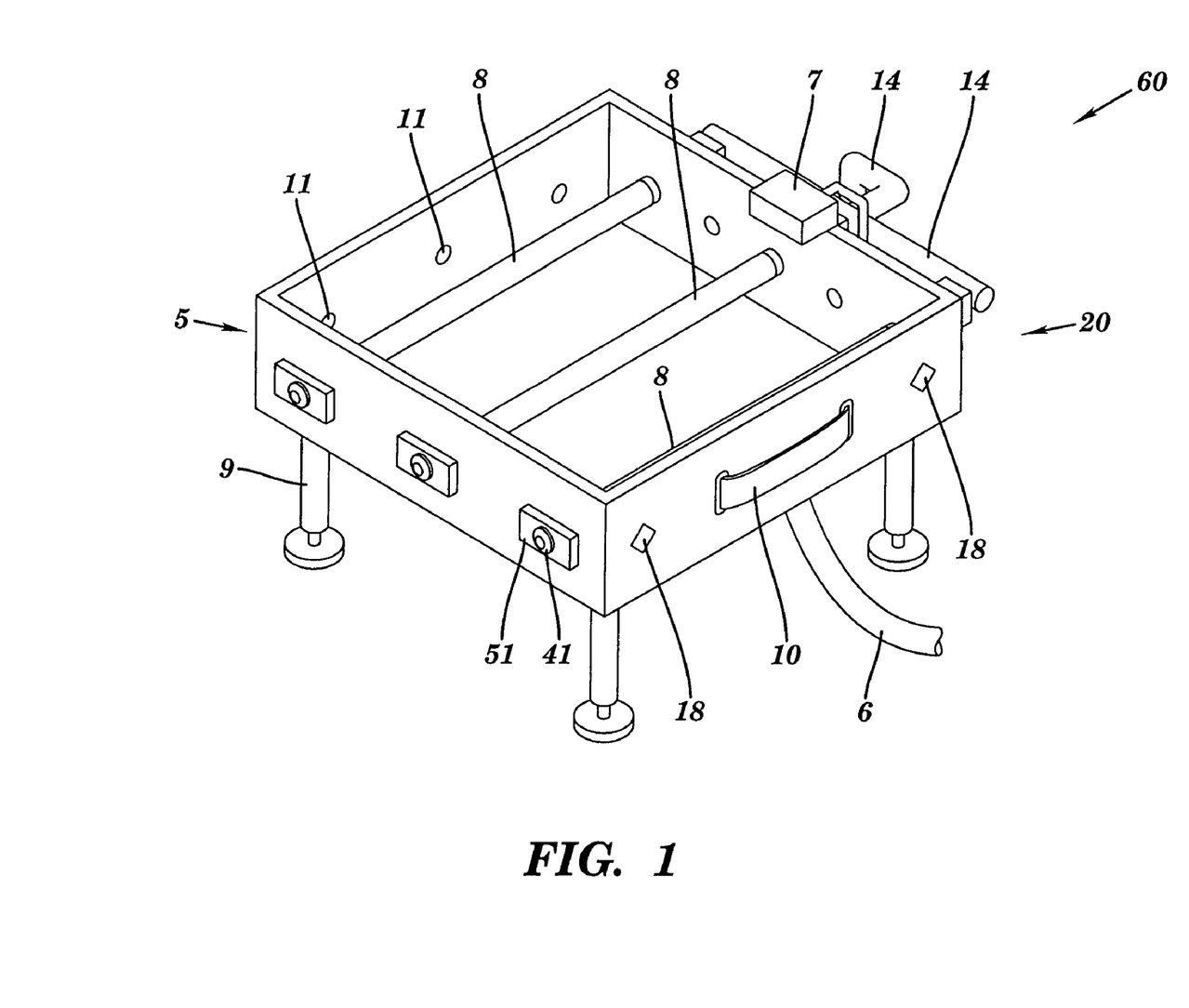
FIG. 1 depicts a front perspective view of an embodiment of a device for training in extinguishing fires, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawing, wherein like reference numeral refer to like elements throughout the drawings. Although the drawings are intended to illustrate the present invention, the drawings are not necessarily drawn to scale.

FIG. 1 depicts a front perspective view of a device 60 for training in extinguishing fires, such as controlled, live fires, in accordance with the present invention. An embodiment of the present invention is the device 60 comprising: a flame generation unit 20 and a control unit 40, (See FIGS. 2 and 3).

Figure 2:
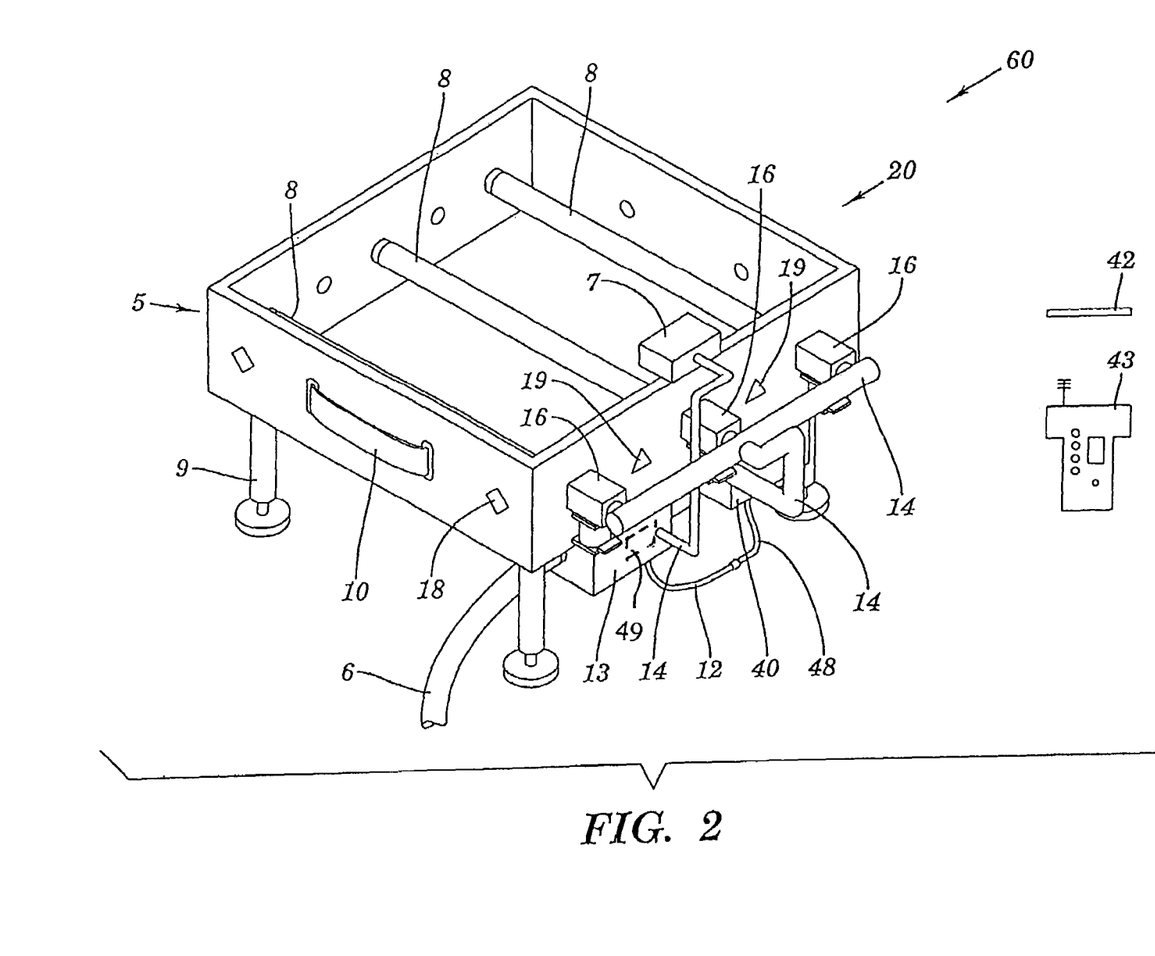
FIG. 2 depicts a rear perspective view of an embodiment of a device for training in extinguishing fires, in accordance with the present invention.

FIG. 2 depicts a rear perspective view of the device 60 for training in extinguishing fires, especially controlled, live fires, in accordance with the present invention. An embodiment of the present invention is the device 60 comprising: a flame generation unit 20 and a control unit 40. Referring to FIG. 1 and FIG. 2, the flame generation unit 20 further comprises: a unit body 5, a fuel inlet 6, a fuel ignition device 7, a flame manifold 8, adjustable supports 9, a transportation handle 10, unit body temperature sensors 11, a control unit communications adapter 12, a fuel flow controller 13, fuel plumbing 14, fuel valves 16, stability sensors 18, and fuel safety sensors 19.

The unit body 5 is typically constructed of materials including but not limited to steel, aluminum, iron, ceramic composites, polymer composites, and combinations thereof. The construction materials, as previously described, to form the unit body 5 are not meant to limit the scope of the materials that may be used in an embodiment of the present invention. Any flame resistant material having the physical and chemical properties to withstand temperatures typically generated by a live fire or controlled live fire can be used thereof in accordance with the method and system of the present invention.

A live fire is a rapid, persistent chemical change that releases heat and light, accompanied by at least one flame, and combinations thereof. A controlled live fire is a rapid, persistent chemical change that releases heat and light, and is accompanied by at least one flame which can be modified in shape, height, volume, size, burn rate, velocity on command, and combinations thereof.

The dimensions (height×width×depth) of the body 5 may be in a range from about 6 inches×12 inches×24 inches to about 18 inches×36 inches×68 inches. The body 5 is supported by adjustable supports 9 that can be removably attached and detached from the body 5. Further, the supports 9 may be telescoping, folding, and the like. The supports 9 can be individually adjusted to accommodate for placement of the flame generation unit 20 on a level surface or uneven terrain such as an open field, a courtyard, unpaved ground, and the like. The supports 9 typically can be adjusted to elevate the unit 20 from about 1 inch to about 3 feet above the level surface or the uneven terrain. However, an embodiment is having supports which may be adjusted to any height off of a surface to allow any user of any height, or any user on a structure (e.g., ladder, scaffold, vehicle, building, etc.) to train in extinguishing fires thereof in accordance with the device, methods, and systems of the present invention.

The fuel inlet 6 interconnects a fuel source (not shown) to the fuel plumbing 14. The fuel source includes but is not limited to tanks, cylinders, drums and combinations thereof containing an ignitable gas or liquid fuel such as ethane, propane, butane, pentane, hexane, gasoline, diesel, and combinations thereof. Typically the fuel source is attached to the inlet 6 via quick connectors, hose, rubber tubing, metal piping, and the like. Fuel plumbing 14 typically is connection pipes, pipe adapters, nipples, joints, and the like which fit together to allow fuel to flow from a fuel source to the fuel controller 13, to the valves 16, and eventually the fuel manifold 8. Further, multiple fuel sources may be connected via multiple fuel inlets 6 and the corresponding plumbing 14.

The fuel flows through the plumbing 14 to the fuel flow controller 13. The controller 13 controls the amount of fuel that flows from the fuel source to the flame manifold 8 as well as the fuel ignition device 7 via fuel valves 16. The valves 16 may be external to the controller 13, as shown in FIG. 2, within the fuel controller (not shown), or combinations thereof.

The controller 13 has the capabilities to control the attributes of the fire generated. For example a class A fire, a class B fire, a class C fire, and the like can be generated with the controller 13. Attributes of each class of fire include but are not limited to flame shape, flame height, flame volume, burn rate, visual effects, and combinations thereof. Furthermore, the aforementioned attributes also may be controlled independent of the controller 13 or in conjunction with the controller 13 using mechanical, electrical, and electromechanical devices such as fans, flaps, louvers, dampers, and the like.

The valves 16 that may be used in an embodiment of the present invention include but are not limited to valves comprising an intermittent pilot light with piezo-ignition, a pilot light with sparker ignition, a thermocouple flame detector, a pilot control, a built in automatic safety shutoff, and combinations thereof. Methods of fuel control include but are not limited to a closed loop-feedback system to control the valve position or a pumping/pressurization method for a liquid fuel optionally combined with a valve system. The pumping/pressurization method is not just for providing the proper air/fuel mixture but can be used to provide different visual effects of the flame produced.

The ignition device 7 ignites the fuel within the flame manifold 8 to produce a flame, i.e., a controlled, live fire that emanates from the manifold 8. The manifold 8 is typically a standard grill type or furnace type manifold that is capable of creating desirable flames or a live fire necessary for use in training in the extinguishing of fires. Alternatively, the manifold 8 may be a custom designed or proprietary device for producing flames or live fires having the most optimal characteristics. Further, the manifold 8 may operate under water by allowing fuel to flow through the manifold and to permeate to the water surface where the fuel then would be ignited producing a live fire.

The ignition device 7 may be a manual ignition device or an automatic ignition device. The controller 13 receives commands from a control unit 40 via the control unit adapter 12. The control unit adapter 12 allows for the control unit 40 to be easily connected to the fuel flow controller 13. Temperature sensors 11 are located along the floor of the unit body 5 and near the fuel flow controller 13. The sensors 11 are in direct communication with the flow controller 13. If a dangerous amount of heat is detected by the sensors 11 within the unit body 5 or in the vicinity of the flow controller 13, a signal is sent to the flow controller 13 to automatically shutdown of the fuel valves 16. Fuel flow to the manifold 8 is prevented resulting in the shutdown of the live fire. The flame generation unit 20 is hand-portable via the transportation handle 10. Alternatively, the flame generation unit 20 as well as the entire device 60 may have dimensions, under certain training circumstances, preventing it from being hand portable. The portability of the flame generation unit 20 and the device 60, as previously described, is not meant to limit the scope of the size of the unit 20 and device 60 that may be used in an embodiment of the present invention.

The temperature sensors 11 also detect and provide feedback to whether the unit body 5 is safe to handle, e.g., disassemble, transport, and the like. The stability sensors 18 provide information to whether the device 60 is stable upon the surface the device 60 has been set on. If an imminent collapse of the device 60 is detected by the sensors 18, a signal is sent to the fuel controller 13 to automatically shut the flow of fuel and subsequently shutdown a live fire that may have been burning. Furthermore, the sensors 18 are able to detect if a sudden or accidental impact to the device 60 has occurred. If such an event is detected, the aforementioned safety procedure would take place, i.e. shout down of the live fire.

The fuel safety sensors 19 are capable of detecting fuel leaks that may occur anywhere along route of fuel flow. (e.g., fuel, intake 6, fuel controller 13, fuel plumbing 14, valves 16, and the flame manifold 8). If a leak is detected, the system shuts down as a safety precaution.

The control unit 40 comprises: at least one input sensor 41, a transmitter 42, a hand-held control device 43, a docking station, memory ports, communication ports, a display, a flame generation unit adapter 48, an internal logic system, and a sensor mount 51. The input sensors 41 are sensors located on the front of the unit body 5 and are in communication with the logic system 49. The sensors 41 may be in wired or wireless communication with the control logic system 49 and are able to recognize inputs such as a class of radiation within the electromagnetic spectrum, an external command, a fire extinguishing agent, a pressure sound wave (ultrasound), and combinations thereof.

The class of radiation within the electromagnetic spectrum includes but is not limited to ultraviolet (UV), visible, infrared (IR), far infrared, microwave, and radio frequency (RF), and combinations thereof. Fire extinguishing agents that may be used as inputs in the present invention include but are not limited to water, an air-water mixture, carbon dioxide, sodium bicarbonate, cornstarch, materials simulating an extinguishant, and standardized extinguishants, and combinations thereof.

External commands include but are not limited to oral/verbal directives given by an individual or by an artificial voice synthesizer/digital voice; electronic directions/orders such as those that can be given by computer, minicomputer, a personal digital assistant (PDA); text messages, visual displays, and the like. Further, pressure waves, a repeating pattern of high pressure and low pressure regions moving through a medium, can be used as an input in an embodiment of the current invention.

Upon receiving the inputs, the sensors 11 communicate with the logic system (not shown) of the control unit 40. The logic system comprises a central processing unit (CPU), random access memory (RAM), read only memory (ROM), at least one internal memory storage device, software, functional algorithms, and the like. The CPU interprets the inputs based upon internal programming and set parameters, and automatically provides an output in response to the inputs.

The output is a command to effectuate a modification to a live fire or a controlled live fire. The fuel flow controller 13 increases, decreases, or stops, and combinations thereof, the fuel flow to the flame manifold 8 via the fuel valves 16 subsequently causing an increase, a decrease, or a complete shutdown of the controlled, live fire. The controller 13 is not an on/off system. As described before, the controller 13 can automatically and interactively control the attributes of a fire. For example a class A fire, a class B fire, a class C fire, and the like can be generated with the controller 13. Attributes of each class of fire include but are not limited to flame shape, flame height, flame volume, burn rate, visual effects, and combinations thereof. Furthermore, the aforementioned attributes also may be controlled independent of the controller 13 or in conjunction with the controller 13 using mechanical, electrical, and electromechanical devices such as fans, flaps, louvers, dampers, and the like.

Another output provided is a calculated performance measurement of a user undergoing training with the device 60. Performance measurements include but are not limited to an overall user score, accuracy score, precision score, training completion time, performance history, remaining extinguishant, aiming accuracy, difficulty level, percent improvement, overall percent improvement, and combinations thereof.

External commands such as oral/verbal directives given by the control unit 40 via an artificial voice synthesizer/digital voice connected to speakers or a microphone within the control unit 40; text messages; visual displays on a computer screen, tv, projection display, or scoreboard; and the like are outputs in accordance with present invention.

Furthermore, an output also may include but is not limited to the flame generation unit 20 producing a simulated fire via special effects; the flame generation unit 20 in connection with a display device to produce a simulated fire; and combinations thereof. Such devices include television displays, LCD projections, video, and the like.

The display is a visual display that is located on at least one face of the control unit 40 which provides data such as performance measurements, current training trial number, training settings, user identification, trainer identification, user expertise level, trainer expertise level, and the like.

The transmitter 42 is a device which can emit/transmit at least one class of radiation within the electromagnetic spectrum, at least one fire extinguishing agent, a pressure wave, and combinations thereof. The class of radiation within the electromagnetic spectrum includes but is not limited to ultraviolet (UV), visible, infrared (IR), far infrared, microwaves, and radio frequency (RF), and combinations thereof. The transmitter 42 is cylindrical in shape having physical dimensions in a range from about 2 inches by 1 inch by 6 inches to about 4 inches by 2 inches by 12 inches. Alternatively, it may spherical, rectangular, square, and combinations thereof.

The transmitter 42 is operably adaptable to a fire suppression device such as a fire extinguisher, a simulated fire extinguisher, a fire hose, a simulated fire hose, a hose, a simulated hose, and combinations thereof. Operably adaptable means that the transmitter 42 is configured to the fire suppression device such that the fire suppression device is able to effectuate operation of the transmitter 42. Alternatively, the transmitter 42 may be fully integrated into any of the aforementioned fire suppression devices. Integration would not be limited to the hose but any part of the flame suppression device. In such an embodiment, the fire suppression device plus the fully integrated transmitter 42 is then viewed as one transmitting unit, i.e., a transmitter.

The transmitter may be operably adapted to fit the aforementioned fire extinguishing devices via a removable snap fit; removably attachable devices such as tape, industrial tape, twine, and wire; screws and bolts, hook and loop type devices, and adhesives such as glue, epoxy resins; and the like.

The hand-held control device 43 allows for remote control and manipulation of the flame generation unit 20 via the control unit 40. The hand-held 43 may be in wired or wireless communication with the control unit 40. All programs and parameters used by the control unit 40 to operate the flame generation unit 20 can be accessed by the hand-held 43 allowing for operation of the flame generation unit 20. The hand-held 43 may further comprise a display window, a CPU, RAM, ROM, and at least one internal memory storage device.

The docking station allows for the hand-held control device 43 as well as any other device compatible with the docking station to physically integrate with the control unit 40. Data, parameter changes, programming changes, and the like may be transferred between the control unit 40 and any device docked into the control unit 40. The memory ports are typically USB ports, pin ports, jacks, and the like for connecting temporary or flash memory devices. Such devices include but are not limited to flash drives, Zip® drives, Jazz® drives, external memory storage and transfer devices, and the like.

The communication ports are ports that allow the control unit 40 to communicate information such as user performance, current training trial number, training settings, user identification, trainer identification, user expertise level, trainer expertise level, and the like to media other than the display or the hand-held control device 43. Such media include but are not limited to printers, other computer terminals, scoreboards, and electronic display boards, other hand-held devices such as a personal digital assistant (PDA), a cell phone, a Blackberry® device; and combinations thereof.

The control unit 40, the hand-held control device 43, the transmitter 42, and combinations thereof have a kill switch that when operated immediately shuts down the flame generation unit 20 subsequently shutting down the live fire.

The flame generation unit adapter 48 is typically a cable that interconnects the control unit 40 and the flame generation unit 20. The adapter 48 connects to the control unit adapter 12 to allow communication between the control unit 40 and the flame generation unit 20.

Figure 3:
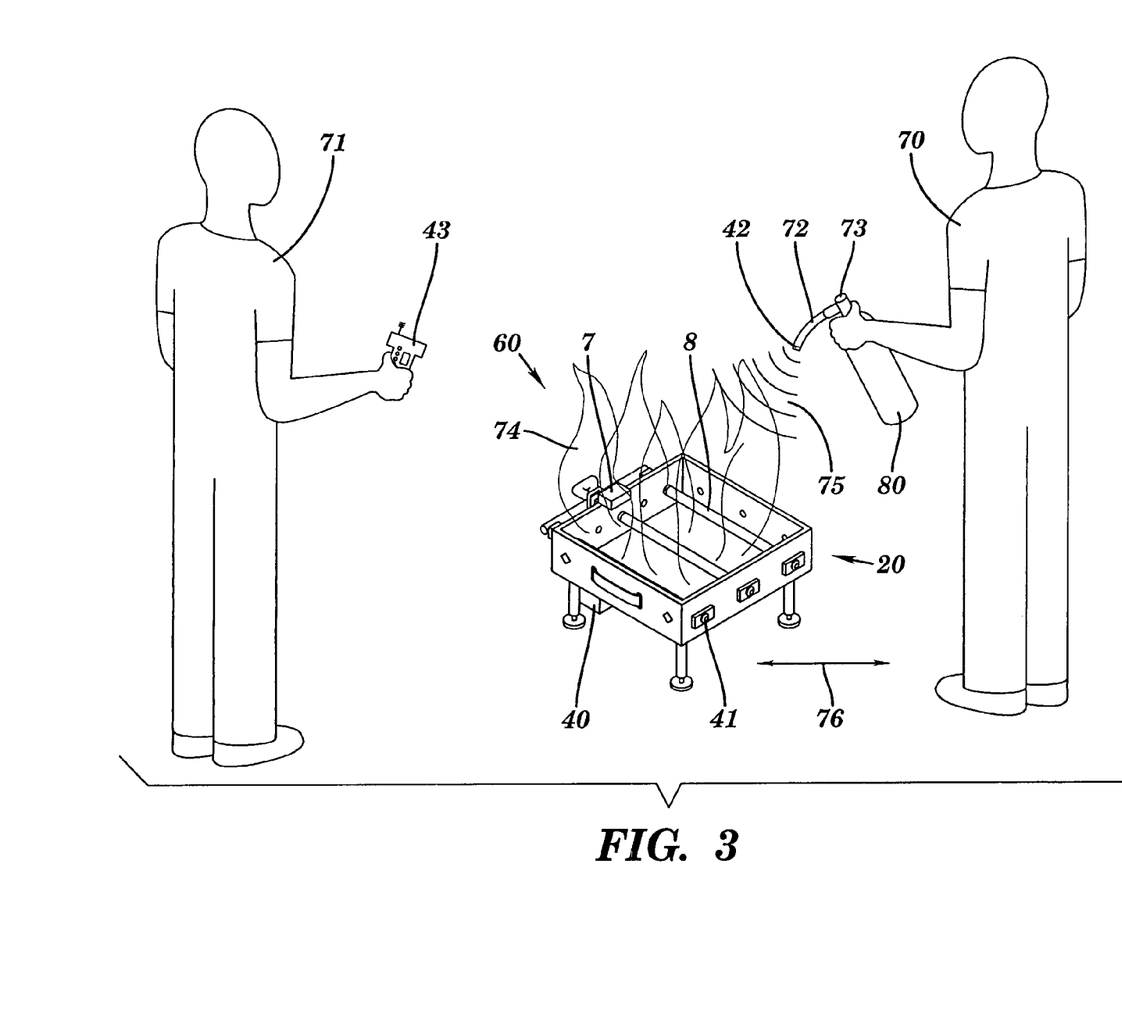
FIG. 3 depicts a front perspective view of an embodiment of the device for training in extinguishing fires in use, in accordance with the present invention.

FIG. 3 depicts a front perspective view of the device 60 for training in extinguishing fires, especially controlled live fires, in use, in accordance with the present invention. Referring to FIG. 1, FIG. 2, and FIG. 3 in operation of the training device 60, the training device 60 comprising a flame generation unit 20 and a control unit 40 is brought to a training area such as a parking lot, a field, and a barren or deserted area, and assembled for use. The supports 9 are screwed or snap fitted into the unit body 5 of the flame generation unit 20 and adjusted such that the device 60 is balanced and secured from tipping over or collapsing. The control unit 40 is then attached to the rear of the body 5 via screws, mounts, clips, and the like. Alternatively, the control unit 40 does not have to be physically integrated to the body 5. The control unit 40 may be in any proximity to the flame generation unit 20 that allows for wired or wireless communication between both units 20 and 40. A fuel source (not shown) such as a propane tank is connected and secured to the fuel inlet 6 and then opened to allow the flow of fuel to the fuel flow controller 13.

The control unit 40 is activated by a power switch and prompts a user to select the parameters or test programs to be used in the training session. The user may be a trainee 70 or a trainer 71. In this example the trainee 70 is the user and the trainer 71 is conducting the training session. Parameters that may be selected include but are not limited to flame height, burn rate, training time, input sensitivity, and the like. Alternatively, the hand-held control device 43 may activate the control unit 40 and be used to select the aforementioned training parameters. The hand-held 43 may be in wired communication with the control unit 40, wireless communication with the unit 40, and combinations thereof. Furthermore, any device in communication with the control unit 40 via the communication ports that has the appropriate software, identification codes, and logic system is capable of conducting the training session.

The pilot light is then lit using the ignition device 7. The control unit 40 indicates the device 60 is ready for use when the control unit 40 has established communication with the hand-held control device 43 and the fuel flow controller 13, and has recognized that the pilot light is on. Operational indicators include but are not limited to visual and audio indicators such as multicolored lights, tones of varying frequency, audio messages, text messages on the display, audio and text messages to external media, and combinations thereof.

A fire extinguisher 80 is filled with compressed air and the water reservoir is filled with water. The transmitter 42 then is operably attached to a fire extinguisher hose 72 allowing the transmitter 42 to be activated when a fire extinguisher lever 73 is depressed in operation of the extinguisher 80. The trainer 72 initiates the training session by giving the appropriate command to the hand-held control device 43. The hand-held 43 signals the control unit 40 which in turn commands the fuel flow controller 13 to allow the propane to flow to the flame manifold 8 and ignite via the pilot light generating a controlled live fire 74. The size of the live fire can be controlled to represent a class A fire, a class B fire, a class C fire, a sudden or flash burn, a smoldering fire, and combinations thereof.

The training session starts when a fire alarm is emitted from the control unit 40 to signal the trainee 70 to begin extinguishing the fire. The trainee 70 picks up an extinguisher 80 operably adapted with the transmitter 42 and depresses the extinguisher lever 73 effectuating the operation of the transmitter 42 (optionally pulls the pin) and emits an air-water mixture simulating a fire extinguishant. The transmitter 42 emits a signal 75 comprising of a class of electromagnetic radiation. In the present example, the signal is a particular RF. The transmitter 42 is operably adapted to the fire extinguisher hose 75 such that the transmitter is aligned with the hose 75. As the trainee 70 is aiming the hose 75 toward the flame generation unit 20 to extinguish the fire, the transmitter 42 emits the RF signal in the same direction as the hose 75 is aimed.

To extinguish the live fire 74, the trainee 70 aims the extinguisher hose 72 toward the base of the fire 74 where the input sensors 41 are located and moves the hose 72 in a lateral motion as indicated by the directional arrow 76. This is one technique used to extinguish a fire in a real life emergency situation and is the technique which is programmed for this particular training session. As the extinguisher hose 75 is swept back and forth in lateral motion 76, using the aforementioned technique, the signals 75 emitted by the transmitter 42 contact the input sensors 41.

The sensors 41 communicate to the control unit 40 that inputs, the transmitted signals 75, are being received. The logic systems of the control unit 40 interpret the inputs based upon internal programming and set parameters, and automatically provides an output in response to the inputs. Parameters used to evaluate the inputs may include but are not limited to inputs received/time, total number of inputs/ total training time, user distance from the device 60, and the like. If the control unit 40 determines the trainee 70 us using the correct technique to extinguish the live fire 74, an output is automatically provided.

The output is a command from the control unit 40 to the fuel flow controller 13 to decrease the fuel flow to the flame manifold 8 via the fuel valves 16 subsequently causing a live fire to decrease in size. If the trainee 70 continues to use the current fire extinguishing technique loaded into the control unit 40, the control unit 40 will continue to receive inputs and continue to automatically provide outputs in response, i.e., commanding the flow controller 13 to decrease the fuel flow and eventually stop the flow altogether. The trainee 70 receives immediate qualitative feedback on their training performance. If the trainee 70 uses the correct fire extinguishing technique, the live flame will decrease in size and eventually be extinguished.

On the other hand, if the trainee 70 uses the incorrect fire extinguishing technique, the live flame 74 will not decrease in size but will actually increase in size until the trainee 70 applies the proper technique. If during the training session the trainee 70 does not aim the extinguisher hose 72 toward the base do the fire 74 and move the hose 72 in a lateral motion as indicated by the directional arrow 76, the signals 75 emitted by the transmitter 42 will not contact the input sensors 41 or will only contact the sensors 41 intermittently. The control unit 40 will determine the trainee 70 is using the incorrect technique to extinguish the live fire 74, the output is automatically provided.

The output is a command to the fuel flow controller 13 to increase the fuel flow to the flame manifold 8 via the fuel valves 16 subsequently causing the live fire 74 to maintain the current size or increase in size. If the trainee 70 continues to use the incorrect fire extinguishing technique, the control unit 40 will continue to receive inputs and continue to automatically provide outputs in response, i.e., commanding the flow controller 13 to increase the fuel flow and subsequently the live flame 74 size until the trainee 70 uses the correct technique.

Another output provided is a calculated performance measurement of the trainee 70 undergoing training with the device 60. Performance measurements provided included but are not limited to an overall user score, training completion time, performance history, remaining extinguishant, aiming accuracy, difficulty levels passed, percent improvement, and the like. The trainee 70 can receive performance measurements via the display, the hand-held control device 43, and through other media including but not limited to printouts, e-mails, text messages, scoreboard displays, electronic display board, and other hand-held devices such as a personal digital assistant (PDA), a cell phone, a Blackberry® device; and combinations thereof.

Alternatively, a trainee 70 could conduct the training session without assistance from another user, i.e. trainer 71. An embodiment in accordance with the present invention is a training session conducted by the device 60 itself. The control unit 40 has intelligence to the logic system housed within. At least three modes of operation exist in which a user may train with the devices, methods, and systems of the present invention.

An instruct mode teaches the trainee 70 how to use a fire extinguisher. External commands such as voice instructions given by the control unit 40 would instruct the trainee 70. Alternatively the control unit 40 could instruct the trainee 70 by printing instruction documents, displaying visual instructions on a tv, large screen display, and the like. For example, the trainee 70 would hear "Pull" from the control unit 40 indicating to the trainee 70 to pull the fire extinguisher pin. The next command, "Aim", would mean to aim the nozzle/hose of the fire extinguisher at the base of the flames of a live fire. "Squeeze" would mean to squeeze the extinguisher lever/release. And finally, "Sweep" to discharge the simulated or real extinguishant across the base of the live fire. It can be envisioned where external commands/instructions would include how to choose the proper fire extinguisher to extinguish a fire. Instructions could also indicate to a trainee 70 when it is too dangerous to extinguish a fire and to evacuate the training area.

A test mode allows the trainee 70 to train on a controlled live fire as described in the above example when the trainer 71 was present. The difference in "test mode" is that the presence of a trainer is not necessary. A third mode is a compete mode. Multiple users can train on the device 60 and have their calculated performance outputs saved by the control unit 40. The performance outputs then can be compared to determine which user had the highest score.

Figure 4:
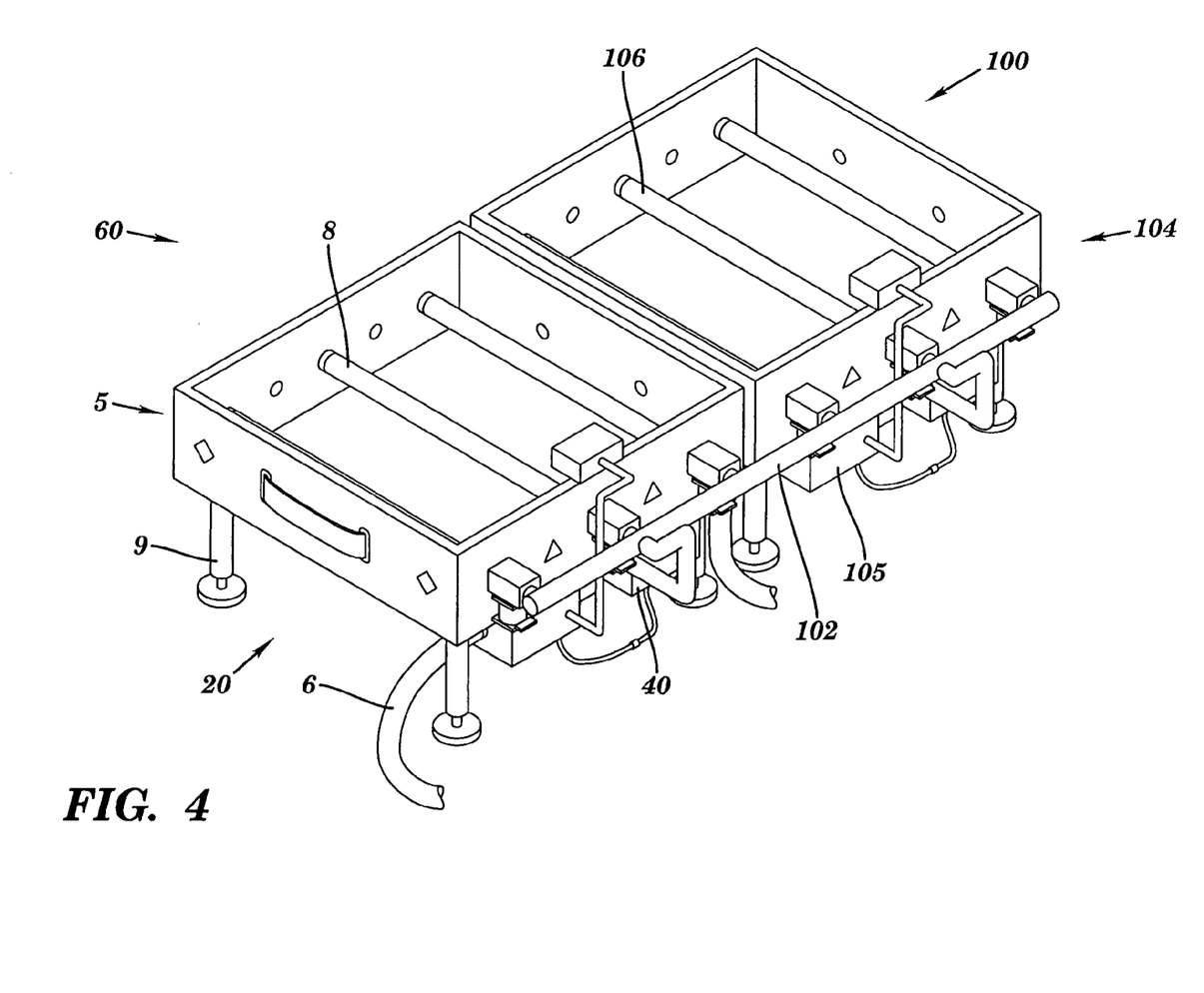
FIG. 4 depicts a perspective view of an embodiment of a modularly configured device for training in extinguishing fires, in accordance with the present invention.

FIG. 4 depicts a perspective view of modularly configured and modularly controlled devices 60 and 100 for training in extinguishing fires, especially controlled live fires, in accordance with the present invention. An embodiment of the present invention is at least one device 60 modularly configured and modularly controlled with at least one other training device 100. Referring to FIG. 1, FIG. 2, and FIG. 4 in operation of the modularly configured and modularly controlled training devices 60 and 100, the training device 60 comprising a flame generation unit 20 and a control unit 40 and at least a second training device 100 comprising a flame generation unit 104 are brought to a training area such as a parking lot, a field, and a barren or deserted area, and each is assembled for use.

The supports 9 are screwed or snap fitted into the unit body 5 of each flame generation unit 20 and 104, and adjusted such that the devices 60 and 100 are balanced and secured from tipping over or collapsing. A fuel source such as a propane tank is connected and secured to the fuel inlet 6 of the device 60. The device 100 then is connected to the fuel plumbing 14 of the device 60 via a fuel conduit 102. The connection allows both devices 60 and 100 to be supplied with fuel from one fuel source. The devices 60 and 100 are now modularly configured in that both devices share one fuel source and are able to generate multiple lives fires from one fuel source. The flame generation device 60 is operably adapted to function with at least the flame generation device 100. The device 100 could further be connected to another device, i.e., module such that three training devices would be sharing one fuel source, would be able to generate three live fires, and still be fully operable.

The control unit 40 is then attached to the rear of the unit body 5 of the flame generation unit 20 via screws, mounts, clips, and the like. The control unit 40 is connected to the fuel flow controller 13 and further connected to a fuel flow controller 105, of the device 100. The devices 60 and 100 are now modularly controlled in that both devices are now able to be controlled by one control unit 40. The control unit 40 is able to effectuate operable at least the flame generation unit 104 of the device 100. The control unit 40 could further be connected to third fuel controller of a third training device, i.e., module such that three training devices would be operated by one control unit. By modularly configuring and modularly operating the training devices, a trainer is able to customize the scope and shape of the overall training session to simulate various scenarios such as waste basket fire, a stove fire, a room fire, an outdoor fire, and the like.

Referring to FIG. 1 and FIG. 4, each device 60 and 100, i.e. module, comprises of a single flame manifold 8 and 106 respectively that is considered to be one live flame zone or burn zone unto itself. Multiple burn zones can be created by modularly configuring and modularly operating multiple devices. Alternatively, multiple burn zones can be created within a single device 60 or 100 by placing at least two flame manifolds within the device 60 or 100 thus generating two live fires from one training device. It can be envisioned where each flame manifold would be controlled independent from the other and hence each live fire would be generated and controlled independently of the other.

The examples previously described for training in extinguishing fires are not meant to limit the scope of the training that may be used in an embodiment of the present invention. Training involving real a fire with a real fire extinguishant and a real fire suppression device; a real fire with a simulated extinguishant and a real fire suppression device; a simulated fire produced using the flame generation unit 20 with a real extinguishant and a real fire suppression device, and a simulated fire produced using the flame generation unit 20 with a simulated extinguishant and a simulated fire suppression device; and combinations thereof can be used in accordance with the device, methods and systems of the present invention.

An embodiment of the present invention is a flame suppression device that simulates the visual, audio, and tactile effects of discharging an actual extinguisher without the cleanup and hazardous conditions which typically result. The device may simulate the physical characteristics of a real fire extinguisher such as weight, shape, mechanical movement, and inertia. The device may also incorporate a simulated discharge ability such as being able to project or create the illusion of projecting a substance that would allow the user to see where they would be extinguishing if they were using a real fire extinguisher.

Another embodiment will further include at least one modified flame suppression device which will release a substance of either actual extinguishant, or any substance which will simulate actual extinguishant. This may include a mixture of air and water vapor, commercially available "smoke" products, dust, or any other visual fluid. The mixture may be pre-mixed, or mixed at any point during the escape of air from the holding tank. The release mechanism may include a plurality of methods such as pressurized air or a pumping device.

If the substance includes an air/water mixture, an additional water reservoir may be included to provide the water. Water may exit in either liquid or vapor phase. The water may be carried using a self pressurized tank, pressurized air when the user compresses the extinguisher handle, a siphon mechanism, or pumping mechanism. Multiple flame suppression devices, such as an extinguisher, may be used, simulating the need to choose between A, B, and C type extinguishers for the type of fire. Their simulated effect may be a function of the type of fire simulated, and the type of extinguisher used.

Various modifications and variations of the described apparatus and methods of the invention will be apparent to those skilled in the art without departing from the scope and spirit of the invention. Although the invention has been described in connection with specific embodiments, outlined above, it should be understood that the invention should not be unduly limited to such specific embodiments. Various changes may be made without departing from the spirit and scope of the invention as defined in the following claims.

What is claimed:

1. A device for training in extinguishing fires comprising:
   a fire suppression device selected from the group consisting of an actual fire suppression device and a simulated fire suppression device, wherein said fire suppression device emits a signal;
   a flame generation unit having at least one fuel valve generating at least one of a live fire and a controlled live fire; and
   a control unit, in communication with said flame generation unit, said control unit having a program, wherein said control unit receives an input of said signal from said fire suppression device and automatically, through said program, increases, decreases, and stops an output of the fuel valve in response to said input from said fire suppression device.

2. The device of claim 1, wherein said input is selected from the group consisting of a class of radiation within an electromagnetic spectrum, at least one external command, at least one fire extinguishing agent, a pressure wave, and combinations thereof.

3. The device of claim 2, wherein said class of radiation is selected from the group consisting of ultraviolet (UV), visible, infrared (IR), far infrared, microwave, and radio frequency (RF), and combinations thereof.

4. The device of claim 2, wherein said fire extinguishing agent is selected from the group consisting of water, an air-water mixture, carbon dioxide, sodium bicarbonate, cornstarch, and combinations thereof.

5. The device of claim 2, wherein said external command is selected from the group consisting of oral commands, electronic commands, electronic signals and combinations thereof.

6. The method of claim 2 wherein said pressure wave is an ultrasound wave.

7. The device of claim 1, wherein said control unit also includes at least one of a calculated performance measurement, at least one external command, and combinations thereof, wherein said calculated performance measurement is selected from the group consisting of an overall user score, an accuracy score, a precision score, a training completion time, a performance history, a remaining extinguishant, an aiming accuracy, a difficulty level, a percent improvement, an overall percent improvement, and combinations thereof.

8. The device of claim 7, wherein said live fire is a rapid, persistent chemical change that releases heat and light, and is accompanied by at least one flame.

9. The device of claim 7, wherein said controlled live fire is a rapid, persistent chemical change that releases heat and light, and is accompanied by at least one flame which can be modified in at least one of shape, height, volume, size on command, and velocity.

10. The device of claim 7, wherein said at least one external command is selected from the group consisting of oral commands, electronic commands, electronic signals, visual signals, and combinations thereof.

11. The device of claim 1, wherein said control unit further comprises at least one of an input sensor, a transmitter, a hand-held control device, and a logic system.

12. The device of claim 11, wherein said hand-held device is in at least one of wireless communication with said control unit, and wired communication with said control unit.

13. The device of claim 11, wherein said input sensor can recognize at least one of a class of radiation within the electromagnetic spectrum, an external command, a fire extingnishing agent, and a pressure wave.

14. The device of claim 11, wherein said transmitter can emit at least one of a class of radiation within the electromagnetic spectrum, an external command, a fire extinguishing agent, and a pressure wave.

15. The device of claim 1, wherein said flame generation unit is selected from the group consisting of a flame generation body, a fuel inlet, a fuel flow controller, an ignition device, at least one flame manifold, at least one temperature sensor, and combinations thereof.

16. The device of claim 1, wherein said control unit is hand-portable.

17. The device of claim 1, wherein said flame generation unit is hand portable.

18. The device of claim 1, further comprising said flame generation unit is in communication with said control unit wherein said communication is via one selected from the group consisting of wireless, wired, and combinations thereof.

19. The device of claim 1, wherein said flame generation unit is modularly configurable with at least one other flame generation unit.

20. The device of claim 19, wherein said modularly configurable includes said at least one flame generation unit is operably adaptable to a second flame generation unit.

21. The device of claim 1, wherein said control unit is modularly operable with at least one flame generation unit.

22. The device of claim 21, wherein modularly operable means that said control unit is able to effectuate operation of at least one flame generation unit.

23. A method for training in extinguishing fires comprising:
providing a simulated fire suppression device, wherein said fire suppression device emits a signal;
providing a flame generation unit;
providing a control unit, in communication with said flame generation unit, said control unit having a program, wherein said control unit receives an input of said signal from said simulated fire suppression device;
generating a live fire by said flame generating unit; and
automatically controlling attributes of said live fire with said input from said simulated fire suppression device by said control unit.

24. The method of claim 23, wherein said input is selected from the group consisting of radiation within an electromagnetic spectrum, an external command, a pressure wave, and combinations thereof.

25. The method of claim 24, wherein said radiation is selected from the group consisting of ultraviolet (UV), visible, infrared (IR), far infrared, microwave, and radio frequency (RP), and combinations thereof.

26. The method of claim 24, wherein said external command is selected from the group consisting of oral commands, electronic commands, electronic signals and combinations thereof.

27. The method of claim 24 wherein said pressure wave is an ultrasound wave.

28. The method of claim 23, further comprising outputting from said control unit a calculated performance measurement selected from the group consisting of an overall user score, an accuracy score, a precision score, a training completion time, a performance history, a remaining extinguishant, an aiming accuracy, a difficulty level, a percent improvement, an overall percent improvement, and combinations thereof.

29. The method of claim 23, wherein said a live fire is a rapid, persistent chemical change that releases heat and light, is accompanied by at least one flame.

30. The method of claim 29, wherein said live fire is a controlled live fire that includes a rapid, persistent chemical change that releases heat and light, and is accompanied by at least one flame said attributes include at least one of shape, height, volume, size, and velocity on command, and combinations thereof.

31. The method of claim 23 further comprising outputting from said control unit an external command is selected from the group consisting of oral commands, electronic commands, electronic signals, visual signals, and combinations thereof.

32. The method of claim 23, wherein said control unit is selected from the group consisting of an input sensor, a transmitter, a hand-held control device, a logic system, and combinations thereof.

33. The method of claim 32, wherein said hand-held device is selected from the group consisting of a wireless communication with said control unit, wired communication with said control unit, and combinations thereof.

34. The method of claim 32, wherein said input sensor can recognize the input selected from the group consisting of at least one class of radiation within the electromagnetic spectrum, at least one external command, at least one fire extingnishing agent, a pressure wave, and combinations thereof.

35. The method of claim 34 wherein said pressure wave is an ultrasound wave.

36. The method of claim 32, wherein said transmitter can emit the input selected from the group consisting of at least one class of radiation within the electromagnetic spectrum, at least one external command, a pressure wave, and combinations thereof.

37. The method of claim 36 wherein said pressure wave is an ultrasound wave.

38. The method of claim 23, wherein said flame generation unit further comprises at least one flame generation body, a fuel inlet, a fuel flow controller, an ignition device, at least one flame manifold, at least one temperature sensor, and combinations thereof.

39. The method of claim 23, wherein said control unit is hand-portable.

40. The method of claim 23, wherein said flame generation unit is hand-portable.

41. The method of claim 23, further comprising said flame generation unit is in communication with said control unit, wherein said communication is via one selected from the group consisting of wireless, wired, and combinations thereof.

42. The method of claim 23, wherein said flame generation unit is modularly configurable with at least one other flame generation unit.

43. The method of claim 23 wherein said live fire is a class of fire selected from at least one of Class A, Class B, and Class C.

44. The method of claim 43 wherein a simulated effect of the live fire is a function of the fire selected.

45. A system having a flame suppression device used during training with a live fire, said system comprising:
a simulated fire extinguisher having a weight and shape of an actual fire extinguisher, said simulated fire extinguisher including a reservoir containing a substance which creates a visual illusion of a real extinguishant that would allow the user to see where they would be extinguishing if they were using an actual fire extinguisher on the live fire, and a release mechanism to release the substance which creates the visual illusion of a real extinguishant on the live fire, and wherein said fire suppression device emits a signal;
a flame generation unit having at least one fuel valve generating at least one of a live fire and a controlled live fire; and
a control unit, in communication with said flame generation unit, said control unit having a program, wherein said control unit receives an input of said signal from said fire suppression device and automatically, through said program, increases, decreases, and stops an output of the fuel valve in response to said input from said fire suppression device.

46. The flame suppression device of claim 45, wherein said substance which creates the illusion of a real extinguishant is selected from the group consisting of a mixture of air and water vapor, commercially available "smoke" products, and dust.

47. A method for training with a live fire, said method comprising:
providing a simulated fire extinguisher having the weight and shape of an actual fire extinguisher, said simulated fire extinguisher including a reservoir containing a substance which creates a visual illusion of a real extinguishant that would allow the user to see where they would be extinguishing if they were using an actual fire extinguisher, wherein said fire suppression device emits a signal;
providing a live fire generated by a flame generation unit;
providing a control unit, in communication with said flame generation unit, said control unit having a program, wherein said control unit receives an input from said signal from said simulated fire extinguisher and automatically, through said program, controls said live fire;
releasing the substance from the simulated fire extinguisher; and
controlling the live fire based upon the input from the simulated fire extinguisher.

48. The method for training with a live fire of claim 47, wherein said method of controlling the live fire further comprising: putting out the live fire, and outputting the time for putting out the live fire.

49. The method for training with a live fire of claim 47, wherein said substance which creates the illusion of a real extinguishant is selected from the group consisting of a mixture of air and water vapor, commercially available "smoke" products, and dust.

50. The method of claim 49 wherein the step of controlling the live fire further comprising controlling said live fire by a pressure wave input from said simulated fire extinguisher.

51. The method of claim 50 wherein said pressure wave is an ultrasound wave.

52. The method of claim 47 wherein said live fire is a class of fire selected from at least one of Class A, Class B, and Class C.

53. The method of claim 52 wherein a simulated effect of the live fire is a function of the fire selected.

* * * * *

UNITED STATES PATENT AND TRADEMARK OFFICE
CERTIFICATE OF CORRECTION

PATENT NO.         : 7,175,439 B2                                            Page 1 of 1
APPLICATION NO. : 10/966740
DATED              : February 13, 2007
INVENTOR(S)        : Darois et al.

It is certified that error appears in the above-identified patent and that said Letters Patent is hereby corrected as shown below:

<u>Column 8</u>
Line 65, delete "us" and insert -- is --

<u>Column 9</u>
Line 23, delete "40" and insert -- 41 --

<u>Column 14</u>
Line 2, delete "is"

Signed and Sealed this

Twenty-ninth Day of May, 2007

JON W. DUDAS
*Director of the United States Patent and Trademark Office*